Figure 1:
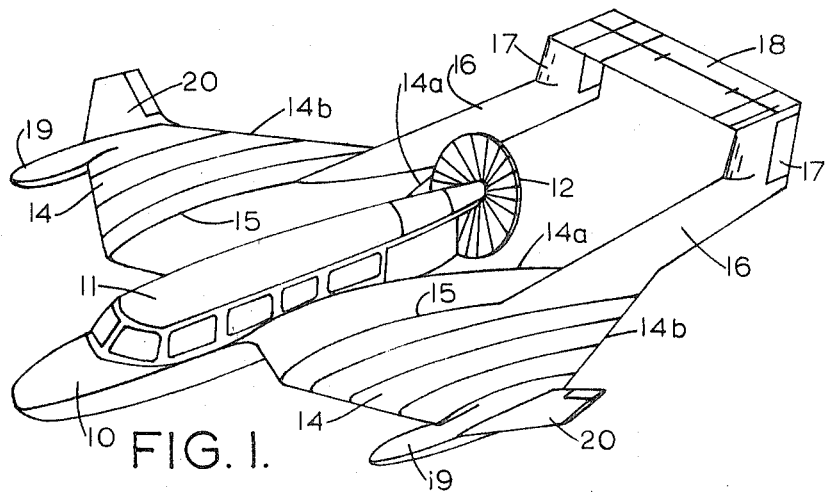

United States Patent

[11] 3,627,235

| [72] | Inventor | Alexander M. Lippisch<br>1416 Oakland Road Apt. 6, Cedar Rapids,<br>Iowa 52402 |
|---|---|---|
| [21] | Appl. No. | 881,676 |
| [22] | Filed | Dec. 3, 1969 |
| [45] | Patented | Dec. 14, 1971 |
| [32] | Priority | Dec. 7, 1968 |
| [33] | | Germany |
| [31] | | P 18 13 311.4 |

[54] WING ARRANGEMENT
7 Claims, 5 Drawing Figs.

[52] U.S. Cl. .................................................. 244/12 R,
244/41, 244/105
[51] Int. Cl. .................................................. B64c 3/10
[50] Field of Search .......................................... 244/12,
101, 105–107, 72, 41, 40, 35, 34, DIG. 1

[56] References Cited
UNITED STATES PATENTS

| 2,678,783 | 5/1954 | Myers | 244/7 B |
|---|---|---|---|
| 3,190,582 | 6/1965 | Lippisch | 244/12 |
| 3,310,261 | 3/1967 | Rogallo et al. | 244/DIG. 1 |

*Primary Examiner*—Milton Buchler
*Assistant Examiner*—Steven W. Weinrieb
*Attorney*—Warren H. Kintzinger ABSTRACT: A combination air and water and/or land takeoff vehicle that in an amphibious or seaplane version, operates as a boat at low speeds and through a transition state at higher speeds to, at low altitude, as a ground effect flying vehicle, and at higher altitude at sufficient speed as a true aircraft. The vehicle has a center fuselage with two generally, triangularly shaped wings extending one to each side from the fuselage with a rear edge of each originating from opposite sides of the stern portion of the fuselage extending backwards and outward to a rearward tip end and then an outer rear edge extending forward and outward to an outer end auxiliary upwardly angled winglet. An engine is positioned in the fuselage in the vicinity of the center of gravity toward the stern and drives a pusher propeller mounted reasonably low and safely between the wings. Each wing defines a concavity open at the front end terminated with combined side and rear edges, generally, common to the same plane.

*INVENTOR.*
ALEXANDER M. LIPPISCH

WING ARRANGEMENT

This invention relates in general to a combination air and water and/or land takeoff vehicle that, in an amphibian or seaplane version, operates as a boat at low speeds, as a transition craft at higher speeds, and at high speed at low skimming altitude as a ground effect flying vehicle, and at higher altitudes as a true aircraft. While, generally, the preceding operational features are common to my previously issued U.S. Pat. No. 3,190,582, issued June 22, 1965 my present invention features two opposite side wings of roughly triangular shape in plan view each convex on the top and concave on the bottom each with combined side and trailing edges in one common plane converging to the rear, and defining a concavity open toward the front in the direction of forward motion.

With some dynamic ground effect vehicles used in water frequented by other boats the propulsion propeller is so mounted as to present a danger to other vehicles or injury to passengers. Such hazard is self evident with mounting of airscrews on the bow and/or the leading edge of wings. If propellers are mounted high over the midsection of a wing or fuselage to minimize propeller hazard other problems arises. The thrust produced by such high-mounted propellers taking effect high above the vehicle center of gravity results in a nose-heavy moment that varies in accord with the magnitude of the thrust, the state of vehicle operation, and the altitude of the vehicle. Further, the air stream from such a high-mounted propeller has serious adverse effects on airflow over aerodynamic wing surfaces and leads to frequent unfavorable shifting of the center of pressure, or lift. A great problem with vehicles flying in ground effects in immediate proximity to the ground and in transition to flight out of ground effect is operational stability in both modes of operation and particularly through the transitory state back and forth between both modes of flight. Some aerofoilboats use underwater screws (propellers) mounted to the stern of a buoyant fuselage partially immersed in water with, however, wings joined to the fuselage not meeting and not forming a ram pressure area between the wings and the water surface.

It is therefore, a principal object of this invention to provide a vehicle capable of moving on water, in ground effect over ground or water, or as an aircraft in full flight having a high degree of operational stability in all modes of operation and through transitions between modes of operation.

Another object with such a vehicle is to minimize propeller hazards to personnel, equipment and other vehicles.

Features of the invention useful in accomplishing these preceding objects include, in a combination air and water ground effects vehicle capable of full flight as a true aircraft, two opposite side wings forming two ram pressure cavities open toward the front and downward. A propulsion unit is located in a center fuselage toward the stern for driving a propeller mounted on the fuselage stern. The propulsion propeller is mounted with minimal yet protected clearance from the water surface when the vehicle is floating on water. Further, the propeller is so enclosed by vehicle structure that danger of injury to people is minimized and hazard of damage to equipment and other vehicles is greatly lessened. The fuselage, mounting two opposite side wings, serves as a float on water, and adjacent rear edges of the wings extend rearward and outward from the stern portion of the fuselage. The wings are basically triangular in plan view with tailbooms extending rearward therefrom to carry rudder and stabilizer surfaces at the rear of the vehicle. The propeller stream with the optimized propeller location for this type vehicle has no disadvantageous changing effect on airflow about the wing and nose heaviness is prevented since the thrust center axis is effectively quite close to the vehicle center of gravity. A water propeller, that may be retractable, is provided with some of these vehicles installed at the fuselage stern for convenient low speed water surface maneuvering and positioning when in port areas.

Specific embodiments representing what are presently regarded as the best modes of carrying out the invention are illustrated in the accompanying drawings.

Figure 2:
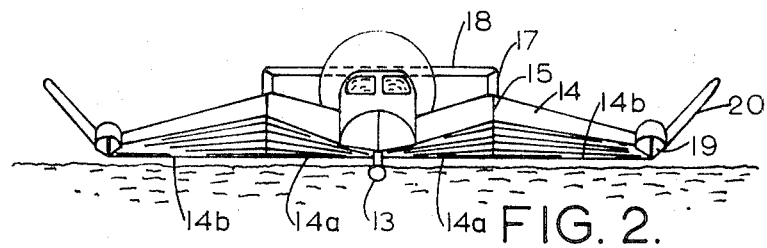
Figure 3:
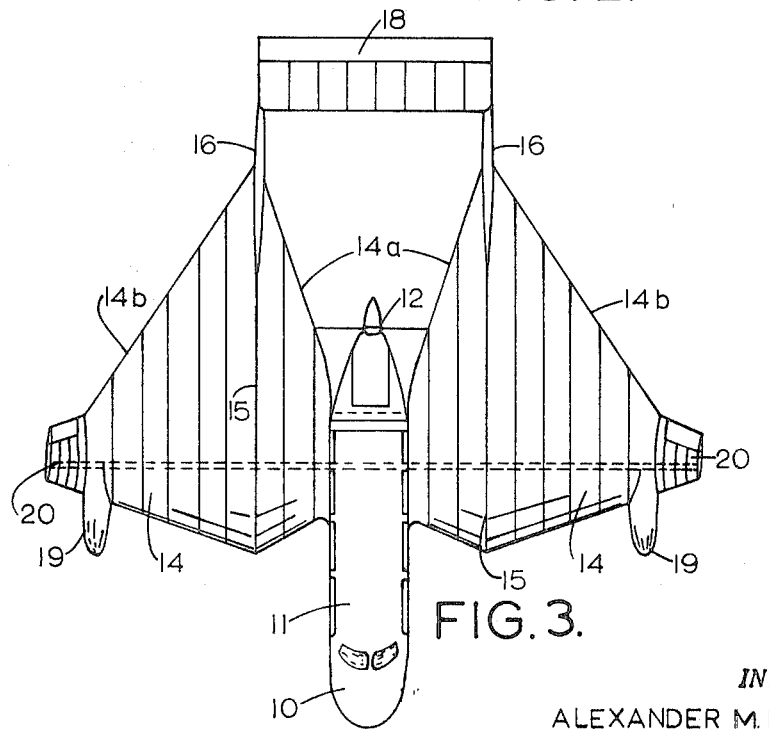
Figure 4:
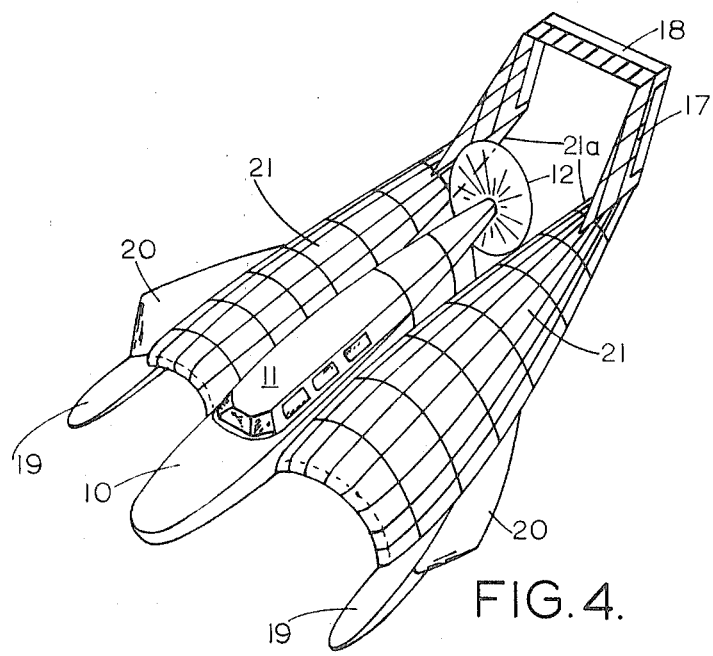
Figure 5:
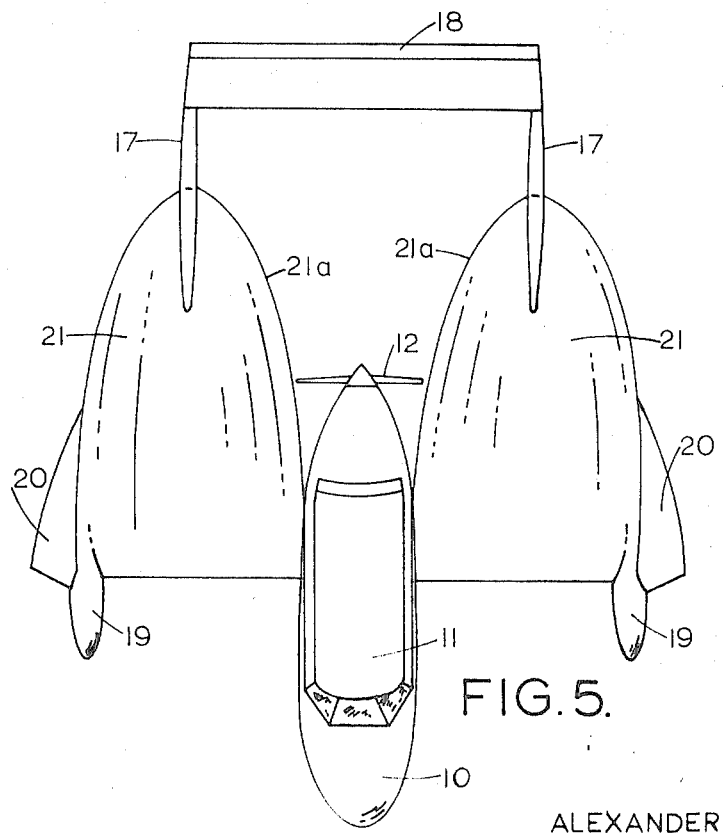

In the drawings:

FIG. 1 represents a perspective view of a ground effect vehicle according to the invention;

FIG. 2, a front view of the vehicle of FIG. 1;

FIG. 3, a top plan view of the vehicle of FIGS. 1 and 2;

FIG. 4, a perspective view of an alternate embodiment of a ground effect vehicle from the embodiment of FIGS. 1, 2 and 3; and, FIG. 5, a top plan view of the vehicle of FIG. 4.

Referring to the drawings:

The surface, or ground, effect water and air vehicle of FIGS. 1, 2, and 3 has a fuselage 10 shaped as a floating body with a passenger cabin 11. Opposite side wings 14 of, generally, triangular shape in plan view extend from opposite sides of fuselage 10. The longitudinal front to rear sections of the wings 14 have a positive incidence toward the common plane of the wing rear edges. Further, the leading edges of the wings are straight sectioned or curved convexly on the top and straight sectioned or curved concavely on the bottom forming an angular or round curvature towards the bottom. The wings 14 each include inward and outwardly extending rear edges 14a and 14b respectively converging toward a point and common to the same plane. Thus, a wing cavity is individually formed on both sides of the fuselage open toward the front and open downward.

During forward motion of the vehicle ram pressure builds up immediately above the ground or water surface within the two wing cavities that, in combination with the aerodynamic suction created with airflow over the curved top surfaces of the wings 14, produces a strong lifting force supporting the vehicle with sufficient vehicle forward speed in the ground effects mode of operation.

As shown in FIG. 2 the two wings 14 and the central fuselage 10 form generally an M as seen from the front. The longest longitudinal section through each wing 14 forms a top ridge 15 that mounts toward the stern and at the stern end thereof a tailboom 16 terminating in a vertical rudder 17 supporting structure for each that also support a cross spanning stabilizer and elevator surface 18 structure. A pusher propeller 12 is mounted on the stern end of the fuselage 10 in a protected area between the rearwardly extending portions of opposite side wings 14 and forward of the stabilizer and elevator surface 18 structure. A power plant is mounted in the stern end of fuselage 10 that may also be fitted at the underside stern end thereof with a retractable water propulsion unit 13. Auxiliary floats 19 are provided at the outer ends of wings 14 with float bottoms terminating in the common plane of the wing rear edges. Relatively short auxiliary wings 20 extending upward and outward from floats 19 and outer ends of wings 14, equipped with aileron like roll and bank control surfaces, serve to stabilize banking maneuvers.

The embodiment of FIGS. 4 and 5 has much in common with the embodiment of FIGS. 1, 2 and 3 both structurally and operationally. With this embodiment, however, the opposite side wings 21 have much more pronounced and uniform curvature leading to excellent lift characteristics in ground effects operation over ground or water. The wings 21 in plan view closely resemble a triangular shape with the rearward inner edges 21a and the outer edges thereof substantially common to the same plane. Please note, that these wings are shaped much as oblique cylinder segments and the wings may easily have been shaped over a cylindrical surface. Other components in this design perform the same as they do with the embodiment of FIGS. 1, 2 and 3 in providing a vehicle with excellent flight stability with optimized ground effect forces consistent with full flight aerodynamic forces and through transition operational states therebetween. Please note that with the generally basically regular triangular wings 21 in plan view with the longitudinal ridges are the high center section of each wing 21. The fuselage is again located between the wings and is shown to protrude toward the front. Please note that both embodiments may be equipped with retractable ground landing wheels in addition to floats for more flexible expanded operational adaptability.

Wherein this invention is herein illustrated and described with respect to specific embodiments hereof, it should be realized that various changes may be made without departing from the essential contributions to the art made by the teachings hereof.

I claim:

1. A vehicle capable of moving on water, closely adjacent to the ground or water in a ground effect area, or as an aircraft in full flight above the ground effect area of operation, including a fuselage, elevator, rudder, powerplant and float means; with a wing arrangement with two opposite side wings one on each side of the fuselage; each side wing being generally of triangular shape in plan view, convex on the top and concave on the bottom, with two trailing edges substantially common to the same plane and converging toward a point to the rear; undersiding of said float means extending to being substantially common to the plane of the wing trailing edges; said wings and float means forming two ram pressure cavities open toward the front and downward; one trailing edge of each wing starting at the stern portion of said fuselage and extending rearwardly and outwardly; and with said fuselage being included with said float means.

2. The vehicle of claim 1, with at least one propeller mounted on the stern of the fuselage with relatively small clearance from the water surface when the vehicle is floating on water.

3. The vehicle of claim 2, with each of said generally triangularly shaped wings formed with a longitudinally extended ridge; and a tailboom extending rearwardly from each of said wing ridges and mounting said rudder and elevator means.

4. The vehicle of claim 3, wherein the ridge of each wing is located closer to the center section of the fuselage than the later distance from the wing ridges to the lateral outer tip wing ends.

5. The vehicle of claim 1, with each of said generally triangularly shaped wings formed with a longitudinally extended ridge substantially in longitudinal alignment with the wing rear pointed apex; and a tailboom extending rearwardly from each of said wing ridges and mounting said rudder and elevator means.

6. The vehicle of claim 5, wherein the ridge of each wing is located closer to the center section of the fuselage than the lateral distance from the wing ridges to the lateral outer tip wing ends.

7. The vehicle of claim 1, wherein each wing is formed with a ridge substantially in longitudinal alignment with the wing rear apex; and with the ridge of each wing closer to the longitudinal center axis of the fuselage than the lateral distance from said wing ridges to the lateral outer tip being wing ends.

* * * * *